United States Patent
Kubota et al.

[11] Patent Number: 5,954,965
[45] Date of Patent: Sep. 21, 1999

[54] PROCESS FOR PRODUCING PURE WATER

[75] Inventors: Hirohisa Kubota; Katsuhiko Yano; Junya Watanabe; Keiko Kudo, all of Yokohama, Japan

[73] Assignee: Mitsubishi Chemical Corporation, Tokyo, Japan

[21] Appl. No.: 08/825,153

[22] Filed: Mar. 26, 1997

[30] Foreign Application Priority Data

Mar. 29, 1996 [JP] Japan ................................ 8-103437

[51] Int. Cl.⁶ .............................. C02F 1/42; C02F 9/00
[52] U.S. Cl. ...................... 210/638; 210/683; 210/685; 210/686; 210/900
[58] Field of Search ................... 210/638, 663, 210/669, 683, 685, 686, 900

[56] References Cited

U.S. PATENT DOCUMENTS

| | | | |
|---|---|---|---|
| 3,870,033 | 3/1975 | Faylor et al. | 210/900 |
| 3,883,490 | 5/1975 | Fujimoto et al. | 210/688 |
| 5,292,439 | 3/1994 | Morita et al. | 210/638 |
| 5,350,523 | 9/1994 | Tomoi et al. | 210/683 |
| 5,518,627 | 5/1996 | Tomoi et al. | 210/682 |

FOREIGN PATENT DOCUMENTS

| | | |
|---|---|---|
| 04349941 | 12/1992 | Japan . |
| 5-16914 | 3/1993 | Japan . |
| 5-66197 | 9/1993 | Japan . |
| 5-329382 | 12/1993 | Japan . |
| 07289921 | 11/1995 | Japan . |
| 8-1156 | 1/1996 | Japan . |

OTHER PUBLICATIONS

Wataru Agui et al, Bull Chem. So. Jpn., vol. 63, No. 10, pp. 2872–2876, 1990, "Fundamental Study on the Production of Ultrapure Water VIII. Removal of Leachables from Mixed–Bed Ion Exchange Resins".

Ikuo Shindoh, R&D Headquaters, UPW Technical Center, JAPAN ORGANO Co, Ltd., vol. 2, No. 2, pp. 69–82, 1991, "ION Exchange Resins for Ultra Pure Water Production".

Friedrich Helfferich, McGraw–Hill Book Company, Inc., pp. 46–49, 1962, "ION EXCHANGE".

Mitsubishi Kasei R&D Review, vol. 8, No. 2, pp. 120–121, 1994.

*Primary Examiner*—Ivars Cintins
*Attorney, Agent, or Firm*—Oblon, Spivak, McClelland, Maier & Neustadt, P.C.

[57] ABSTRACT

The present invention relates to a process for producing pure water having a total organic carbon content of not more than 200 ppb instantly after start of the operation of a high purity water system, comprising using as an ion exchange resin a specific strongly basic anion exchange resin and passing raw water through the high purity water system at a space velocity of not less than 20. The produced pure water is capable of producing tasteless and odorless pure water instantly after start of the operation of the high purity water system.

17 Claims, 1 Drawing Sheet

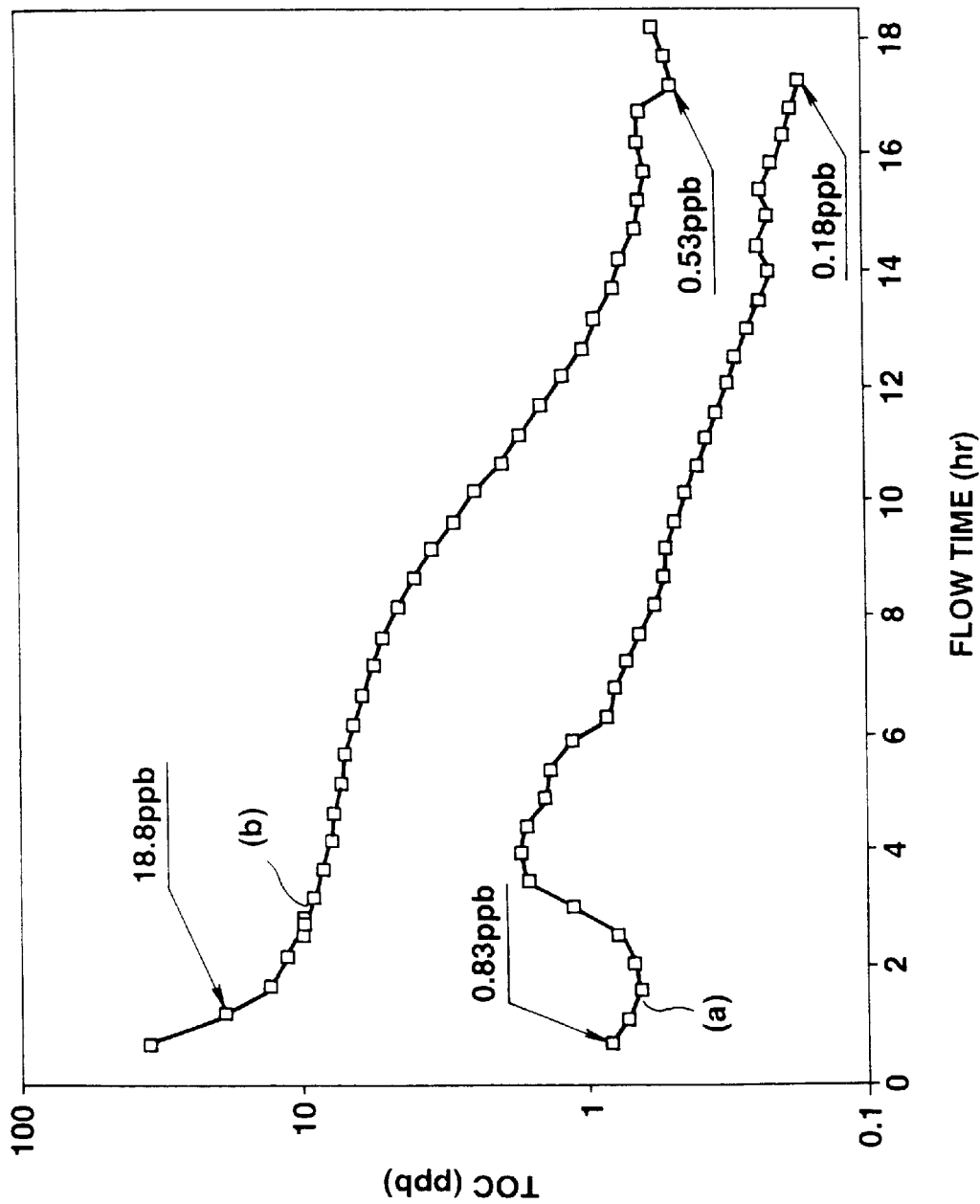

PROCESS FOR PRODUCING PURE WATER

BACKGROUND OF THE INVENTION

The present invention relates to a process for producing pure water, and more particularly, it relates to an economical process for producing pure water comprising using a specific anion exchange resin.

In the art of pure water production in recent years, there is a tendency of incorporating a desalting step in the process for the sake of quality control. In fact, the process using a high purity water system of a double bed system or mixed bed system using a strongly acidic cation exchange resin and a strongly basic anion exchange resin is widely adopted in practice as such process is capable of removing substantially all of the ions dissolved in water.

Various types of strongly acidic cation exchange resins and strongly basic anion exchange resins have been used in the art. For instance, as disclosed in Japanese Patent Application Laid-open (Kokai) Nos. 4-349941 and 7-289921, a strongly basic anion exchange resins having the structural units represented by the following formula (I) are known as heat resistant resins:

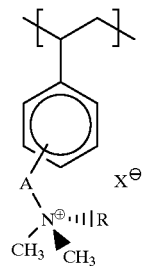

wherein A is a $C_3$–$C_6$ straight-chain alkylene group or a $C_5$–$C_7$ alkoxymethylene group; R is a $C_1$–$C_4$ alkyl group which may be substituted with a hydroxyl group; and X is a counter ion coordinated to an ammonium group.

Also, in Japanese Patent Application Laid-open (Kokai) Nos. 5-49949, 5-49950, 5-49951 and 7-289920 are disclosed a process for producing pure water, a process for producing water for pharmaceuticals or cosmetics, and a method for decolorization of saccharic solution using strongly basic anion exchange resins. In any of these methods, however, attention is focused only on heat resistance of the strongly basic anion exchange resins. Especially, Japanese Patent Application Laid-open (Kokai) No. 5-49950 teaches that desalted water with no remnant of amine smell can be produced by using the strongly basic anion exchange resins, but this Japanese Kokai is silent on such matters as concentrations of the eluted substances in the produced desalted water and the concrete production conditions.

Most of the high purity water systems using conventional strongly basic anion exchange resins or known anion exchange resins (Japanese Patent Application Laid-open (Kokai) No. 5-49950) are at a disadvantage in that they are incapable of producing tasteless and odorless pure water soon after start of the operation of the high purity water system. The substances eluted from the strongly basic anion exchange resin, such as amines and acetaldehydes, are held responsible for the lingering taste and odor in the produced pure water. Therefore, in order to produce pure water with a trimethylamine concentration of not more than 20 ppb and a total organic carbon content of not more than 200 ppb, which are the standard requirements for the tasteless and odorless potable water, it is necessary to previously pass ultrapure water of an amount of several thousand times the volume of the strongly basic anion exchange resin through the high purity water system. This is a serious economical disadvantage. Further, it is impossible to produce pure water instantly after start of the operation of the high purity water system in case of passing at a space velocity of not less than 20.

As a result of the present inventors' extensive researches, it has been found that by using as an ion exchange resin a specific heat-resistant strongly basic anion exchange resin, and passing raw water at a space velocity of not less than 20, it is possible to produce pure water having a total organic carbon content of not more than 200 ppb instantly after start of the operation of a high purity water system. The present invention has been attained on the basis of the above finding.

SUMMARY OF THE INVENTION

The object of the present invention is to provide a process for producing pure water, which is capable of producing tasteless and odorless pure water instantly after start of the operation of the high purity water system.

To accomplish the aim, in a first aspect of the present invention, there is provided a process for producing pure water having a total organic carbon content of not more than 200 ppb instantly after start of the operation of a high purity water system, comprising using as an ion exchange resin a strongly basic anion exchange resin having the structural units represented by the following formula (I) and passing raw water through the high purity water system at a space velocity of not less than 20.

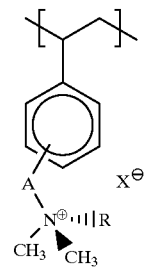

wherein A is a $C_3$–$C_6$ straight-chain alkylene group or a $C_5$–$C_7$ alkoxymethylene group; R is a $C_1$–$C_4$ alkyl group which may be substituted with a hydroxyl group; and X is a counter ion coordinated to an ammonium group.

In a second aspect of the present invention, there is provided a process as defined in the first aspect, wherein in the formula (I), A is n-butylene group, propylene group and n-butoxymethylene group, and R is methyl group.

In a third aspect of the present invention, there is provided a process as defined in the first aspect, wherein the produced pure water is of such purity that the total organic carbon content is not more than 200 ppb and the trimethylamine concentration is not more than 20 ppb.

In a fourth aspect of the present invention, there is provided a process as defined in the third aspect, wherein the strongly basic anion exchange resin used therefor is the one obtained by subjecting to a pretreatment with a polar organic solvent or an alkali aqueous solution and then rinsing with water of an amount of not more than 20 times the volume of the anion exchange resin.

In a fifth aspect of the present invention, there is provided a process as defined in the first aspect, which uses a high purity water system of a double bed system or mixed bed system using a strongly acidic cation exchange resin and the strongly basic anion exchange resin.

In a sixth aspect of the present invention, there is provided a process as defined in the fifth aspect, wherein the strongly acidic cation exchange resin is the one which is sterilized in its regenerated form.

In a seventh aspect of the present invention, there is provided a process as defined in the third aspect, wherein the pure water produced is suited for pharmaceutical, cosmetic and food-related uses, or as potable water.

In an eighth aspect of the present invention, there is provided a process as defined in the first aspect, wherein the total organic carbon content in the produced pure water is less than 10 ppb.

In a ninth aspect of the present invention, there is provided a process as defined in the eighth aspect, wherein the produced water is ultrapure water.

In a tenth aspect of the present invention, there is provided a process as defined in the eighth aspect, wherein the high purity water system used is a secondary high purity water system comprising at least a sterilizer, a polisher and a membrane separator.

In an eleventh aspect of the present invention, there is provided a process as defined in the eighth aspect, wherein the strongly acidic cation exchange resin used is the one obtained by subjecting to a pretreatment with a polar organic solvent or an alkali aqueous solution and then rinsing with water of an amount of not more than 100 times the volume of the strongly acidic cation exchange resin.

In a twelfth aspect of the present invention, there is provided a process as defined in the eleventh aspect, wherein the total organic carbon content in the produced pure water is not more than 2 ppb.

In a thirteenth aspect of the present invention, there is provided a process as defined in the eleventh aspect, wherein raw water is passed at a space velocity of not less than 50, and the total organic carbon content in the produced pure water is not more than 1 ppb.

In a fourteenth aspect of the present invention, there is provided a process as defined in the eleventh aspect, wherein raw water is passed at a space velocity of not less than 100, and the total organic carbon content in the produced pure water is not more than 0.5 ppb.

In a fifteenth aspect of the present invention, there is provided a process as defined in the eighth aspect, wherein the high purity water system is of a single bed system.

BRIEF DESCRIPTION OF THE DRAWING

FIG. 1 is a graph of the relationship of a flow time and an amount of the total organic carbon (TOC) in example 2.

DETAILED DESCRIPTION OF INVENTION

The present invention is described in further detail below.

It is essential that the strongly basic anion exchange resin used in the present invention is ones having the structural units represented by the formula (I). Such a resin is known in the art and can be easily obtained by the methods such as described in Japanese Patent Application Laid-open (Kokai) Nos. 4-349941 and 7-289921.

The strongly basic anion exchange resin used in the present invention contain usually 20 to 99 wt %, preferably 50 to 98 wt % of the structural units of the formula (I). Also, the strongly basic anion exchange resin used in the present invention contain usually 0.1 to 50 wt %, preferably 0.5 to 30 wt % of the structural units derived from the crosslinkable monomers.

In the formula (I), A represents a $C_3$–$C_6$ straight-chain alkylene group or a $C_5$–$C_7$ alkoxymethylene group. Examples of such alkylene group include propylene, butylene and pentylene, and examples of the alkoxymethylene group include butoxymethylene and pentoxymethylene. R represents a $C_1$–$C_4$ alkyl group which may be substituted with a hydroxyl group, and X represents a counter ion coordinated to an ammonium salt.

Of these strongly basic anion exchange resins, it is preferred in the present invention to use the one in which A in the formula(I) is n-butylene group, propylene group or n-butoxymethylene group and R is methyl group. The strongly basic anion exchange resins having the structural units of the formula (I) are low in decomposition rate of the anion exchange group, so that the amount of the substances eluted from the strongly basic anion exchange resin, such as trimethylamine, dimethylethanolamine and acetaladehyde, can be confined to a minimum. This contributes to realizing obtainment of pure water with a total organic carbon (TOC) content of not more than 200 ppb instantly after start of the operation of the high purity water system.

In case of using the resins other than the strongly basic anion exchange resins having the structural units of the formula (I), that is, in case of using the conventional general-purpose ion exchange resins, the substances eluted from the ion exchange resin are contained in the treated water as explained in the Examples described later. Therefore, in order to obtain the desired pure water, it is necessary to conduct a pretreatment such as passing ultrapure water of an amount of several thousand times the volume of the strongly basic anion exchange resin or hydrolyzing TOC by adding an oxidizing agent. On the contrary, according to the process of the present invention, it is possible to obtain pure water with a TOC content of not more than 200 ppb instantly after start of the run of the high purity water system without conducting the pretreatment.

The passing (flowing) raw water in the present invention is conducted at a space velocity (SV) of not less than 20 for an ordinary room temperature. By adopting such passing (flowing) water conditions, it is possible in economical to produce pure water with a TOC content of not more than 200 ppb instantly after start of the run of the high purity water system. The "space velocity" means a parameter indicating a times amount of water passed per one hour based on the volume of the ordinary ion exchange resin regenerated at a room temperature. For example, when 2,000 ml of water are passed through 100 ml of the ion exchange resin, the space velocity (SV) is 20.

According to the present invention, it is possible to obtain pure water with a TOC content of not more than 200 ppb by the above passing water conditions. There can also be produced pure water suited for pharmaceutical, cosmetic and food-related uses or for drinking by reducing the trimethylamine concentration to not more than 20 ppb. In this case, it is advisable to pretreat the strongly basic anion exchange resin having the structural units of the formula (I) with an polar organic solvent or an alkali aqueous solution, and cleaning with water of an amount of not more than 20 times the volume of the strongly basic anion exchange resin.

By such a pretreatment, it is possible to produce at high efficiency pure water with a trimethylamine concentration of not more than 20 ppb and a TOP content of not more than 200 ppb instantly after start of the operation of the high purity water system.

As the polar solvent used in the solvent treatment (cleaning), methanol, ethanol, isopropyl alcohol, ethylene glycol, acetone, dioxane, tetrahydrofuran, acetonitrile, methylal and the like as well as their aqueous solutions can be favorably used. Use of a column cleaning system may be recommend because of high cleaning efficiency. The amount of the polar organic solvent to be used is usually not less than 0.2 times, preferably not less than 0.5 times the volume of the strongly basic anion exchange resin. The contact time is usually at least 10 minutes. The strongly basic anion exchange resin used in the present invention is of any one of a loaded form and regenerated form. It is preferred that the cleaning treatment is conducted in an OH form of the strongly basic anion exchange resin in which the resin swells easily.

The kind of the alkali solution used for the alkali solution treatment is not critical, but it may be recommended to use an aqueous solution of caustic alkali, alkali carbonate or the like. The above alkali solution treatment is preferably carried out usually at a pH of not less than 10, preferably not less than 12. If necessary, the alkali solution treatment may be conducted under heating at a temperature of not less than 80° C.

The strongly basic anion exchange resin which has been subjected to the pretreatment is usually rinsed with water of an amount of not more than 20 times the volume of the strongly basic anion exchange resin. In case of using a conventional ion exchange resin, when a pretreatment such as mentioned above is conducted, it is necessary to conduct the rinsing treatment with a more amount of water for obtaining the desired pure water (for example, an amount of more than 100 times the volume of the ion exchange resin). According to the present invention, it is possible to shorten the time for water rinsing and to reduce the amount of water necessary for the treatment.

Usually, the ion exchange resin-treated water, when used as potable water, is required to be germfree. Therefore, the ion exchange resin used for the treatment also needs to undergo a sterilization treatment. There are known various methods of sterilization, such as alcohol cleaning, alkali cleaning, γ-ray sterilization, EOG sterilization, etc., but high-temperature sterilization is generally employed. Usually, approximately 30-minute steam sterilization at around 120° C. is conducted. The strongly basic anion exchange resin used in the present invention allows no elution of its component substances even when subjected to such a high-temperature sterilization treatment. Further, the strongly basic anion exchange resin regenerated can be also conducted with the sterilization treatment.

The high purity water system used in the present invention is preferably either a double bed system or a mixed bed system using the strongly basic anion exchange resin and a strongly acidic anion exchange resin. The mixed bed system, however, is complicated in the regenerating step and takes much time for this step, and further since the carbonic component in the raw water offers a load on the strongly basic anion exchange resin, large quantities of a strongly basic anion exchange resin and a regenerating agent are required. Therefore, the double bed system which is less vulnerable to these disadvantages is preferred. As the double bed system for use in the present invention, there can be employed, for example, a two-bed two-tower system in which a cation tower packed with a strongly acidic cation exchange resin and an anion tower packed with a strongly basic anion exchange resin, are connected in series to each other, or a two-bed three-tower system in which a desalting tower is additionally provided. The strongly acidic cation exchange resin used in this system is not specified, and various known types of strongly acidic cation exchange resin can be used.

The raw water to be supplied to the high purity water system is not specifically defined and any water which is or has been made potable by a proper treatment, such as natural water and tap water, can be used. If necessary, the raw water may be subjected to a pretreatment such as dechloro treatment before supplied to the high purity water system.

According to the process of the present invention, it is also possible to produce so-called ultrapure water having a TOC concentration of not more than 10 ppb, used as cleaning water in the IC producing process in semiconductor industry. In a typical higher purity water (ultra pure water) system, raw water is first passed through a pretreatment means comprising a condensation filter device and a two-bed three-tower ion exchanging device, and then passed through a primary high purity water system comprising an ultraviolet irradiator, a deaerator and a mixed bed system comprising a strongly acidic cation exchange resin and a strongly basic anion exchange resin, and further through a secondary high purity water system comprising an ultraviolet oxidization device, a polisher and a membrane separator.

In the present invention, a strongly basic anion exchange resin having the structural units of the formula (I) is preferably used in the polisher of the secondary high purity water system. In the present invention, the polisher is preferably of a mixed bed system using a combination of a strongly basic anion exchange resin and a strongly acidic cation exchange resin. The strongly acidic cation exchange resin may also be of the commonly used types. Further, in the present invention, since elution of TOC from the resin can be drastically suppressed by use of a specific strongly basic anion exchange resin, it is theoretically possible to use a single bed system.

It is also possible to produce ultrapure water with a further reduced TOC concentration by using a strongly basic anion exchange resin which has been treated with a polar organic solvent or an alkali aqueous solution, in the same way as in production of pure water suited for pharmaceutical, cosmetic and food-related used or as potable water. Namely, even if water is passed through the conventional anion exchange resin at a space velocity of not less than 100, it is impossible that the TOC concentration reduces to 5 ppb. On the contrary, in case of using strongly basic anion exchange resin having the structural units of the formula (I), it is possible to produce pure water with a TOC concentration of not more than 2 ppb. It is also possible to further reduce the TOC concentration to less than 1 ppb when the space velocity is increased not less than 30, and to less than 0.5 ppb when the space velocity is elevated not less than 100. The upper limit of the space velocity is preferably 500.

After the pretreatment of the strongly basic anion exchange resin, the rinsing treatment with water is required in the similar way as described above. In the present invention, it is possible to obtain desired ultrapure water by rinsing with not more than 100 times the volume of the strongly basic anion exchange resin.

According to the present invention, as explained above, it is possible to produce tasteless and odorless pure water instantly after operation of the high purity water system by using a specific strongly basic anion exchange resin. This is of great economical significance for the industry concerned.

EXAMPLES

The present invention is explained in more detail in the following Examples, however, it should be recognized that the scope of the present invention is not restricted to these Examples.

In the present invention, the conventional high purity water system can be used without substantial modification, so that in the following description of the embodiments of the present invention, there will emphatically be discussed the performance of the strongly basic anion exchange resins pretreated according to the present invention.

In the following Examples, the trimethylamine concentration was measured by using a gas chromatograph (GC-14APSI with surface inonization-type detector (manufactured by Shimadzu Corp.). The electric conductivity was measured by using an ordinary apparatus. The amount of TOC (total organic carbon) eluted out in the produced water was measured by using a total organic carbon measuring device (TOC-5000 (manufactured by Shimadzu Corp.) in Example 1 and Anatel A-100 PSE (manufactured by Shimadzu Corp.) in Example 2).

Production Example 1

Using 4-bromobutylstyrene, divinylbenzene and trimethylamine, and following the procedure of Production Example 2 in Japanese Patent Application Laid-open (Kokai) No. 4-349941,a strongly basic anion exchange resin A with an exchange capacity of 1.26 meq/ml and a water content of 51.2% was obtained.

Production Example 2

Using 4-bromobutoxymethylstyrene, divinylbenzene and trimethylamine, and following the procedure of Production Example 2 in Japanese Patent Application Laid-open (Kokai) No. 7-289921, a strongly basic anion exchange resin B was obtained.

Comparative Resin 1

A styrene-divinylbenzene copolymer having trimethyl ammonium groups (a commercial resin for potable water, Diaion RDA-02, produced by Mitsubishi Chemical corporation) was used.

Comparative Resin 2

A styrene-divinylbenzene copolymer having trimethyl ammonium groups (Diaion SA11AL, produced by Mitsubishi Chemical corporation) was used.

Example 1

Production of Pure Water for Pharmaceutical, Cosmetic, Drinking and Food-related Uses (Measurement of trimethylamine)

100 ml of each of resin A of Production Example 1, resin B of Production Example 2, comparative resin 1 and comparative resin 2, each being an I-type strongly basic anion exchange resin, was packed in a glass column having an inner diameter of 14 mm. A 4% NaOH solution was passed over each of the strongly basic anion exchange resins at a space velocity (SV) of 5 for one hour. After parallel flow regeneration, ultrapure water was similarly passed at the same flow rate. Then, ultrapure water was passed over the regenerated resin at SV 10 and the treated water was sampled. The trimethylamine concentration of each sample was measured by gas chromatography. The results are shown in Table 1.

TABLE 1

| Rinsing time (hr) | Resin A | Resin B | Comparative resin 1 | Comparative resin 2 |
|---|---|---|---|---|
| 0.5 | 18 | 18 | 63 | 510 |
| 1 | 6.8 | 7.2 | 29 | 290 |
| 3 | 4.0 | 5.1 | 14.3 | 85 |

(The figures in the above table indicate the eluted trimethylamine concentration (ppb).)

Table 1 shows that elution of trimethylamine is minimized according to the process of the present invention using a specific strongly basic anion exchange resin. This attests to applicability of the process of the present invention to the production of pure water, especially pure water for pharmaceutical, cosmetic, drinking or food-related uses.

(Strongly basic anion exchange resin rinsability test)

80 ml of each of the strongly basic anion exchange resins (C1 type)was packed in a 15 mmφ glass column and regenerated at 25° C. using 400 ml of 1N NaOH. Then, NaOH was effused with a bed volume (BV) of 2 of desalted water and the desalted water was passed through the column at SV 20. Desalted water was passed in an amount of 20, 60 or 100 times the volume of the resin. Water was recovered and its electric conductivity and TOC content were measured. The results are shown in Table 2 and Table 3.

TABLE 2

| Rinsing rate (BV) | Resin A | Comparative resin 1 |
|---|---|---|
| 20 | 0.295 | 3.25 |
| 60 | 0.113 | 2.26 |
| 100 | 0.078 | 1.76 |

(Figures in the table indicate electric conductivity ($\mu$S/cm).)

TABLE 3

| Rinsing rate (BV) | Resin A | Comparative resin 1 |
|---|---|---|
| 20 | 135 | 2750 |
| 60 | 108 | 1620 |
| 100 | 90 | 1120 |

(Figures in the table indicate the amount of eluted TOC (ppb).)

It is seen from Tables 2 and 3 that the strongly basic anion exchange resin treated according to the present invention is minimized in elution of its component substances and makes it possible to produce pure water with an eluted TOC content of not more than 200 ppb instantly after start of the operation of the high purity water system. This ensures usefulness of the process of the present invention for the production of pure water.

Example 2

Production of Ultrapure Water

Ultrapure water was produced by using resin A of Production Example 1 and comparative resin 2.

500 ml of each resin (C1 type, regenerated resin) was packed in a 30 mm×76 cm glass column. Guaranteed methanol was passed through the column with BV 3 and at SV 1 at room temperature. Then pure water (TOC=1.18 ppb; resistivity=17.8 MΩ·cm; water temperature=26.2° C.; number of fine particles having not less than 0.07 $\mu$m of particle diameter=70 pieces/ml) was passed through the column with BV 5 and at SV 20 to force out methanol. Thereafter, pure water was passed at SV 30, and water quality was determined at the column outlet. The results are shown in FIG. 1, in which "a" indicates the result obtained when using resin A of Production Example 1 and "b" indicates the result obtained when using comparative resin 2.

What is claimed is:

1. A process for producing a pure water having a total organic carbon content of not more than 200 ppb immediately after start of the operation of a high purity water system, comprising passing raw water through the high purity water system at a space velocity of not less than 20, wherein the high purity water system contains a strongly basic anion exchange resin having the structural units represented by the following formula:

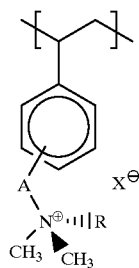

wherein A is a $C_3$–$C_6$ straight-chain alkylene group or a $C_5$–$C_7$ alkoxymethylene group; R is a $C_1$–$C_4$ alkyl group which may be substituted with a hydroxyl group; and X is a counter ion coordinated to the ammonium group.

2. A process according to claim 1, wherein A is a n-butylene group, a propylene group, or a n-butoxymethylene group, and R is methyl group.

3. A process according to claim 1, wherein the pure water has a total organic carbon content of not more than 200 ppb and a trimethylamine concentration of not more than 20 ppb.

4. A process according to claim 3, wherein, prior to said passing step, the strongly basic anion exchange resin is subjected to a pretreatment with a polar organic solvent or an alkali aqueous solutions and then rinsed with water in an amount of not more than 20 times the volume of the anion exchange resin.

5. A process according to claim 3, wherein the pure water produced is suitable for pharmaceutical, cosmetic and food-related uses, or as potable water.

6. A process according to claim 1, wherein the high purity water system is a double bed system or mixed bed system comprising a strongly acidic cation exchange resin and the strongly basic anion exchange resin.

7. A process according to claim 6, wherein the strongly acidic cation exchange resin is sterilized in its regenerated form.

8. A process according to claim 6, wherein the strongly acidic cation exchange resin is, prior to said passing step, subjected to a pretreatment with a polar organic solvent or an alkali aqueous solution and then rinsed with water in an amount not more than 100 times the volume of the strongly acidic cation exchange resin.

9. A process according to claim 8, wherein the total organic carbon content in the pure water is not more than 2 ppb.

10. A process according to claim 8, wherein the raw water is passed at a space velocity of not less than 50, and the total organic carbon content in the pure water is not more than 1 ppb.

11. A process according to claim 8, wherein the raw water is passed at a space velocity of not less than 100, and the total organic carbon content in the pure water is not more than 0.5 ppb.

12. A process according to claim 1, wherein the total organic carbon content in the pure water is less than 10 ppb.

13. A process according to claim 12, wherein the pure water is ultrapure water.

14. A process according to claim 12, wherein the high purity water system is a secondary high purity water system comprising a sterilizer, a polisher and a membrane separator.

15. A process according to claim 12, wherein the high purity water system is a single bed system.

16. A process for purifying water, comprising:

passing a raw water through a strongly basic anion exchange resin which comprises structural units represented by the following formula:

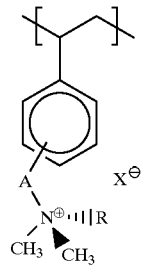

at a space velocity of not less than 20, to produce a purified water, wherein the purified water produced immediately after beginning the process has a total organic carbon content of not more than 200 ppb, A is a $C_3$–$C_6$ straight-chain alkylene group or a $C_5$–$C_7$ alkoxymethylene group;

R is a $C_1$–$C_4$ alkyl group which may be substituted with a hydroxyl group; and X is a counter ion coordinated to the ammonium group.

17. The process of claim 16, wherein the anion exchange resin is not treated prior to said passing step by passing ultrapure water through the resin in an amount of several thousand times the volume of the resin.

* * * * *